United States Patent
Consonni

(10) Patent No.: US 10,654,119 B2
(45) Date of Patent: May 19, 2020

(54) HOBBING TOOL WITH REPLACEABLE CUTTING INSERTS

(71) Applicant: SECO TOOLS AB, Fagersta (SE)

(72) Inventor: Andrea Consonni, Cassano (IT)

(73) Assignee: Seco Tools AB, Fagersta (SE)

( * ) Notice: Subject to any disclaimer, the term of this patent is extended or adjusted under 35 U.S.C. 154(b) by 0 days.

(21) Appl. No.: 16/311,446

(22) PCT Filed: Apr. 7, 2017

(86) PCT No.: PCT/EP2017/058441
§ 371 (c)(1),
(2) Date: Dec. 19, 2018

(87) PCT Pub. No.: WO2018/001585
PCT Pub. Date: Jan. 4, 2018

(65) Prior Publication Data
US 2019/0232405 A1 Aug. 1, 2019

(30) Foreign Application Priority Data

Jun. 30, 2016 (EP) .................................... 16177229

(51) Int. Cl.
*B23F 21/16* (2006.01)
(52) U.S. Cl.
CPC .................. *B23F 21/166* (2013.01)
(58) Field of Classification Search
CPC ...... B23F 21/166; B23F 21/163; B23F 21/16; B23F 21/186; B23F 21/183; B23F 21/18
See application file for complete search history.

(56) References Cited

U.S. PATENT DOCUMENTS

| 3,688,368 A | 9/1972 | Bodem |
| 3,740,808 A * | 6/1973 | Shioya .................. B23F 21/166 407/25 |
| 4,536,106 A | 8/1985 | Zorn |
| 2009/0169312 A1 | 7/2009 | Sjoo |

(Continued)

FOREIGN PATENT DOCUMENTS

| CN | 103071864 A | 5/2013 |
| DE | 191524 C | 10/1907 |
| DE | 147635 A1 | 4/1981 |

(Continued)

*Primary Examiner* — Alan Snyder
(74) *Attorney, Agent, or Firm* — Corinne R. Gorski

(57) ABSTRACT

A hobbing tool includes a hob body having at least one axially extending slot, and at least one cassette removably disposed in the at least one slot. The at least one cassette includes at least one seating recess having at least a bottom abutment surface and two side abutment surfaces. At least one cutting insert is removably mounted in the at least one seating recess. The at least one cutting insert has at least one bottom supporting surface and two side supporting surfaces that abut the bottom abutment surface and the two side abutment surfaces when the at least one cutting insert is received in the at least one seating recess. The hob body includes a plurality of axially extending slots. The hobbing tool also includes a corresponding plurality of cassettes removably mounted in the plurality of axially extending slots. Each cassette of the plurality of cassettes is identical to every other cassette of the plurality of cassettes.

10 Claims, 7 Drawing Sheets

(56) References Cited

U.S. PATENT DOCUMENTS

2017/0182573 A1* 6/2017 Shinjo ..................... B23C 5/207

FOREIGN PATENT DOCUMENTS

| DE | 3535079 A1 | 4/1987 | |
|----|----|----|----|
| DE | 202015004072 U1 * | 9/2016 | ............... B23C 5/22 |
| JP | S522388 U | 1/1977 | |
| JP | S63156617 A | 6/1988 | |
| JP | 01228718 A * | 9/1989 | ............ B23F 21/166 |

* cited by examiner

# HOBBING TOOL WITH REPLACEABLE
CUTTING INSERTS

RELATED APPLICATION DATA

This application is a § 371 National Stage Application of PCT International Application No. PCT/EP2017/058441 filed Apr. 7, 2017 claiming priority to EP 16177229.8 filed Jun. 30, 2016.

BACKGROUND AND SUMMARY

The present invention relates to hobbing tools and, more particularly, to hobbing tools with replaceable cutting inserts.

At present hobs for generating gears below a certain size are generally solid tools made of high speed steel (HSS) or cemented carbide. Replaceable cutting inserts in hobbing tools are uncommon due to the low quality of those tools and their inability to guarantee fine quality of the gear. Indexable inserts are typically used in hobbing tools for roughing, pre-grinding, or pre-shaving operations. Other types of hobbing tools that have provided higher quality gears include inserted-blade cutter assemblies with removable blades, but these blades are made of solid cemented carbide or HSS and are different from each other. They do not provide an indexable insert solution and, therefore, wear on the cutting edges of the blade requires removal and sharpening and recoating or replacement of the blade.

The following documents disclose different hobbing tools CN 103 071 864 A, U.S. Pat. Nos. 4,536,106 A, 3,688,368 A, JP S52 2388 U and JP S63 156617 A.

It is desirable to provide a hobbing tool with replaceable cutting inserts that permits to generate better quality gears with a small module hob. It is further desirable to provide a hobbing tool with replaceable and indexable cutting inserts that permits to generate better quality gears with a small module hob.

According to an aspect of the present invention, a hobbing tool comprises a hob body comprising at least one axially extending slot, at least one cassette removably disposed in the at least one slot, wherein the at least one cassette comprises at least one seating recess having at least a bottom abutment surface and two side abutment surfaces, and at least one cutting insert removably mounted in the at least one seating recess, at least one cutting insert having at least one bottom supporting surface and two side supporting surfaces that abut the bottom abutment surface and the two side abutment surfaces when the at least one cutting insert is received in the at least one seating recess. The hob body comprises a plurality of axially extending slots. The hobbing tool comprises a corresponding plurality of cassettes removably mounted in the plurality of axially extending slots. Each cassette of the plurality of cassettes is identical to every other cassette of the plurality of cassettes.

BRIEF DESCRIPTION OF THE DRAWINGS

The features and advantages of the present invention are well understood by reading the following detailed description in conjunction with the drawings in which like numerals indicate similar elements and in which.

DETAILED DESCRIPTION

Figure 1:
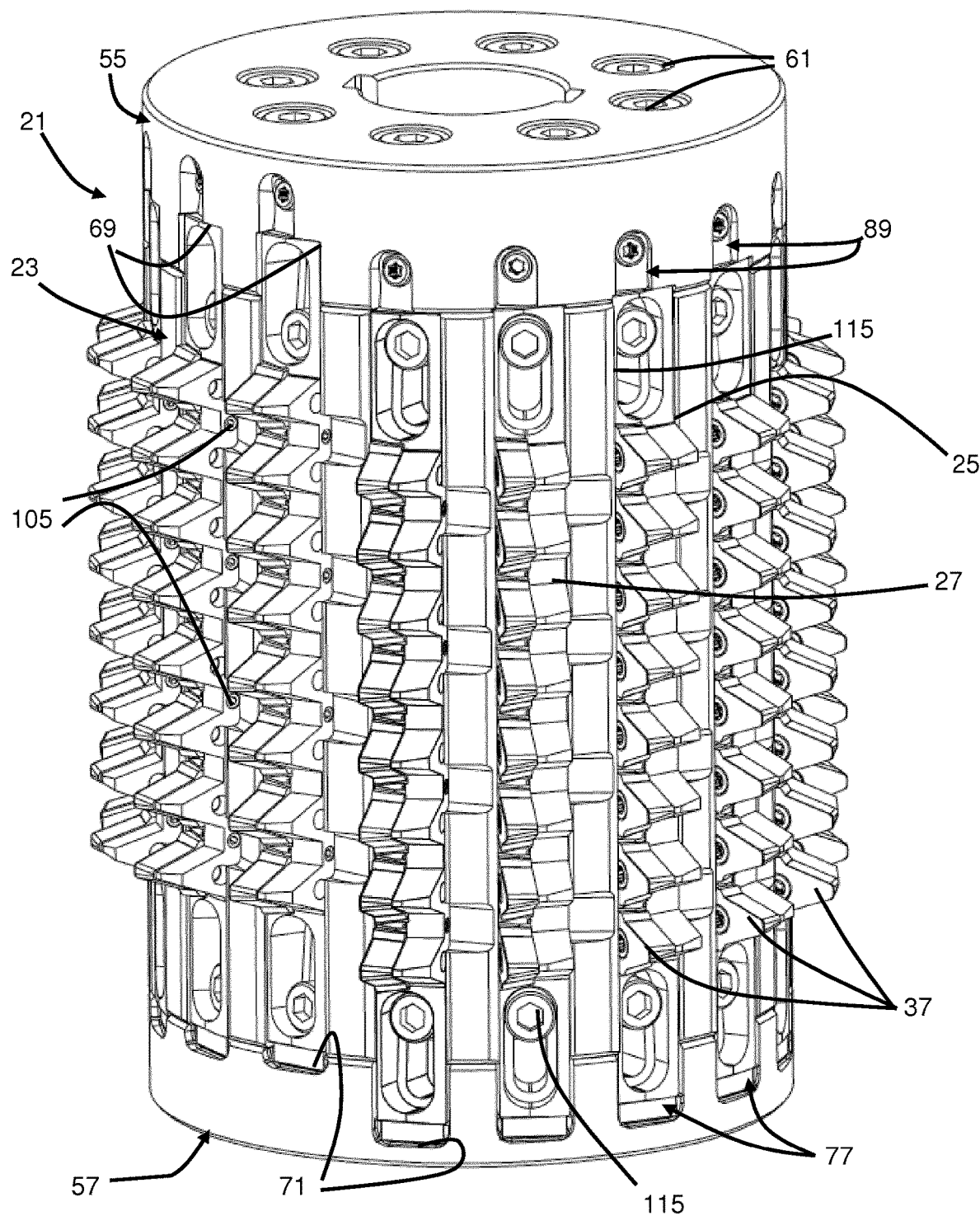
FIG. 1 is a perspective view of a hobbing tool according to an aspect of the present invention.
Figure 2:
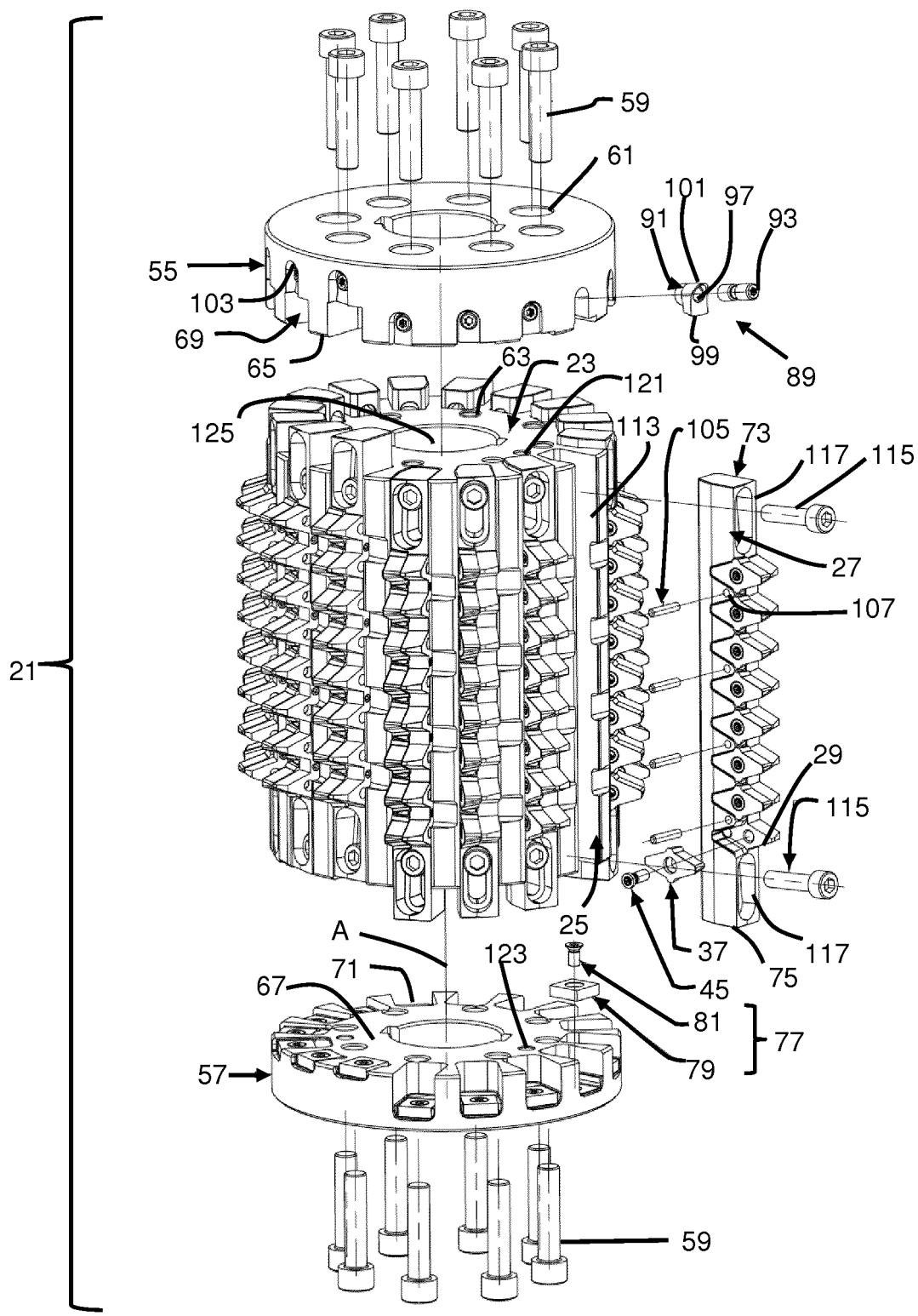
FIG. 2 is an exploded perspective view of the hobbing tool according to an aspect of the present invention.

A hobbing tool 21 is shown in FIG. 1, and in exploded form in FIG. 2. The hobbing tool 21 includes a hob body 23 comprising at least one axially extending slot 25 and, typically, a plurality of slots—sixteen are shown in the hobbing tool in FIG. 2. The hobbing tool 21 also includes at least one cassette 27 removably disposed in the at least one slot 25, with each cassette being disposed in a respective slot. Each slot 25 is ordinarily identical to every other slot and each cassette 27 is ordinarily identical to every other cassette, and the slots are compatible with the cassettes so that any cassette can be received in any slot.

Figure 5:
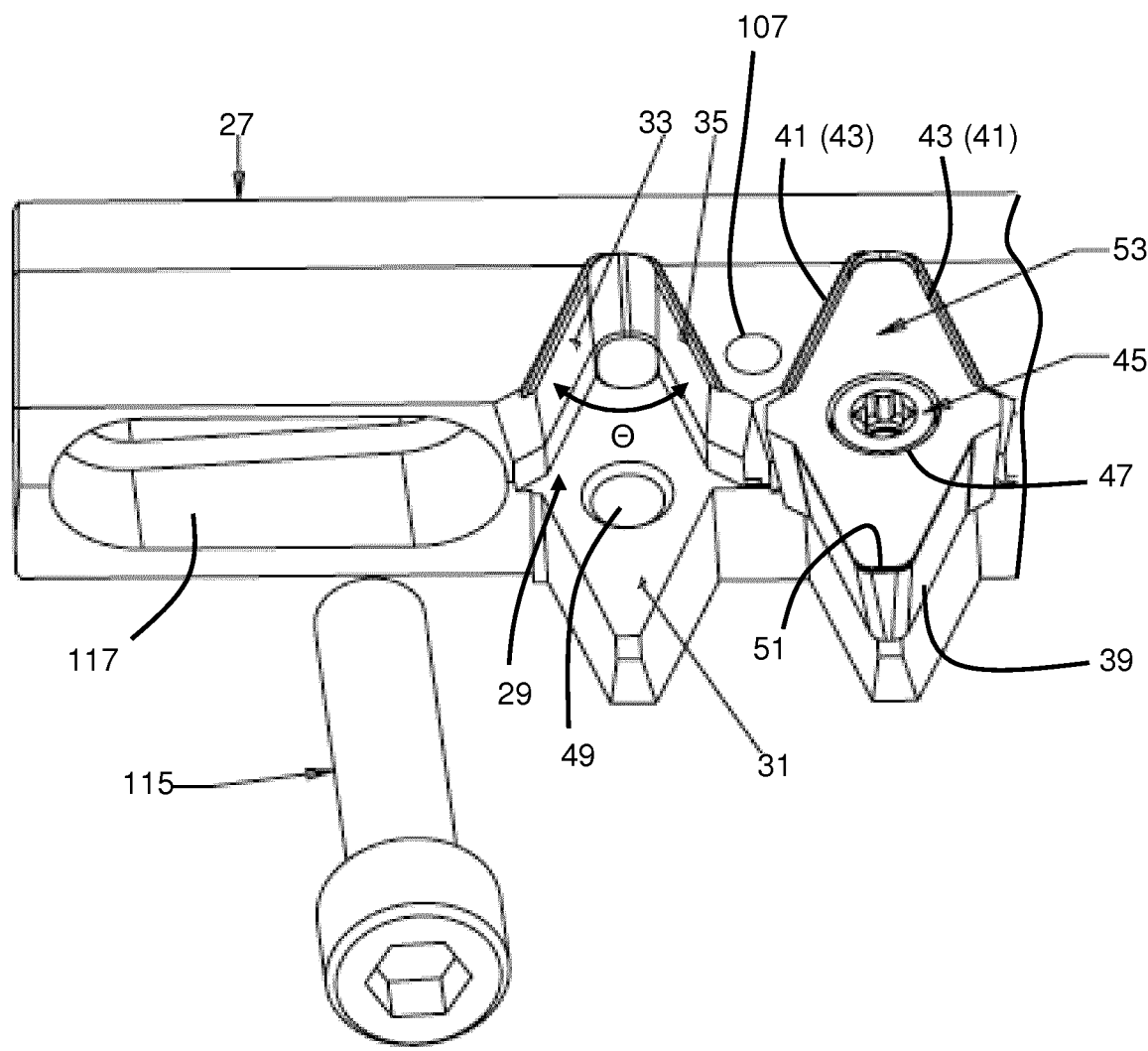
FIG. 5 is a perspective view of a portion of a cassette with cutting inserts according to an aspect of the present invention.

Each cassette 27 comprises at least one seating recess 29 having, as seen, for example, in FIG. 5 at least a bottom abutment surface 31 and two side abutment surfaces 33 and 35. A cutting insert 37 is removably mounted in each seating recess 29. The cutting insert 37 has at least one bottom supporting surface 39 and two side supporting surfaces 41 and 43 that abut the bottom abutment surface 31 and the two side abutment surfaces 33 and 35 when the cutting insert is received in the at least one seating recess. The side abutment surfaces 33 and 35 are typically generally flat and define an angle Θ between them. The side supporting surfaces 41 and 43 are also typically generally flat and define an angle of Θ or slightly greater than Θ between them to ensure that each side supporting surface contacts a corresponding side abutment surface at all times.

The cutting insert 37 is clamped in the seating recess 29 by a suitable clamping means, such as a screw 45 that extends through a central through hole 47 in the cutting insert and that has external threads that mate with internal threads in a hole 49 in the cassette 27. Other suitable clamping means include but are not limited to clamps having arms that contact a top surface of the insert to clamp it in place.

The illustrated cutting insert 37 has four sides of equal length and is indexable to two positions so that two different cutting edges 51 can be disposed in a working position. The illustrated cutting insert 37 is single sided, however, it is also possible to provide double-sided inserts in which each side can function as a bottom supporting surface 39 when it abuts the bottom abutment surface 31 of the seating recess 29, while the opposite side can function as a top chip surface 53. The illustrated cutting insert has two cutting edges 51 associated with the top chip surface 53. The insert has four surfaces that are each associated with respective ones of the four sides of equal length. The cutting insert 37 is indexable so that, when two of the four surfaces associated with respective ones of the four sides of equal length abut either of the two side abutment surfaces 33 and 35, those two surfaces function as the side supporting surfaces 41 and 43. By indexing the cutting insert 37 in the seating recess 29, different pairs of the four surfaces associated with respective ones of the four sides of equal length can function as the side supporting surfaces 41 and 43. The illustrated cutting insert 37 is indexable to two positions, however, other cutting inserts may not be indexable, or may be indexable to more positions than the illustrated cutting insert, such as by providing a double-sided cutting insert or by providing a cutting insert with more than four sides.

As seen in, e.g., FIG. 2, the hobbing tool 21 comprises a top flange 55 and a bottom flange 57 attached to the hob body 23, typically by bolts 59 that extend through holes 61 in the flanges and that have external threads that mate with internal threads of holes 63 in the hob body 23. The holes 61 in the flanges 55 and 57 and the holes 63 in the hob body 23 typically but not necessarily extend parallel to the axis A of the hobbing tool 21. The top flange 55 has a bottom end 65 facing the hob body 23 and the bottom flange 57 has a top end 67 facing the hob body 23.

The bottom end 65 of the top flange 55 and the top end 67 of the bottom flange 57 each comprise top recesses 69 and bottom recesses 71 equal in number to the number of cassettes 27 for receiving top ends 73 and bottom ends 75, respectively, of respective ones of the of cassettes. Each recess 69 and 71 of the plurality of recesses in one or, as illustrated, both of the top flange 55 and the bottom flange 57 has a different axial depth than any other recess of the plurality of recesses in the one of the top flange and the bottom flange, i.e., they are "stepped". By having the depths of the recesses 69 and/or 71 steadily decrease from the depth of a first, deepest recess to the depth of a shallowest recess that is ordinarily adjacent to the deepest recess as the recesses proceed around the circumference of the top and bottom flanges 55 and 57, the changes in depth of the recesses can result in the cutting inserts 37 on cassettes 27 mounted on the hobbing tool 21 forming a helix. It is not, however, necessary that the cassettes 27 and inserts 37 form a helix. In addition to forming a single helix as shown in FIGS. 1 and 2, it will be appreciated that other configurations can be provided, such as a double or triple start (i.e., double or triple thread), or greater, configuration by providing different top and bottom flanges with appropriately adapted top and bottom recesses. Similarly, hobbing tools with cutting inserts arranged to form left or right hand threads can be provided by appropriate adaptation of the top and bottom recesses in the top and bottom flanges.

Figure 4B:
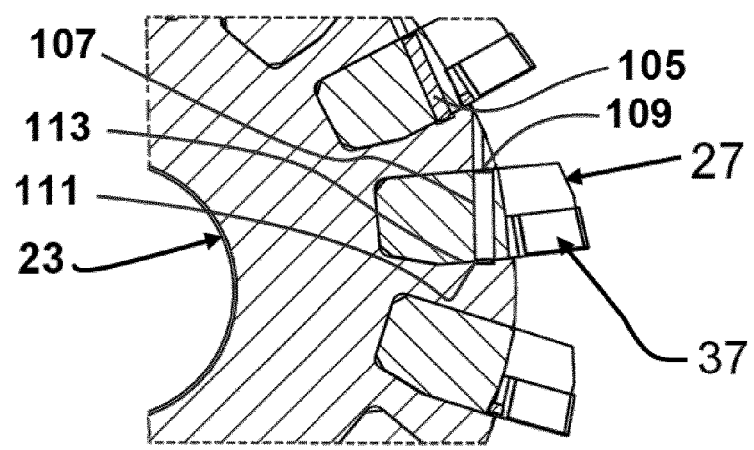
FIG. 4B is a cross-sectional view of the hobbing tool of FIG. 3 taken at section 4B-4B of FIG. 4A.
Figures 4A, 4C, 4D:
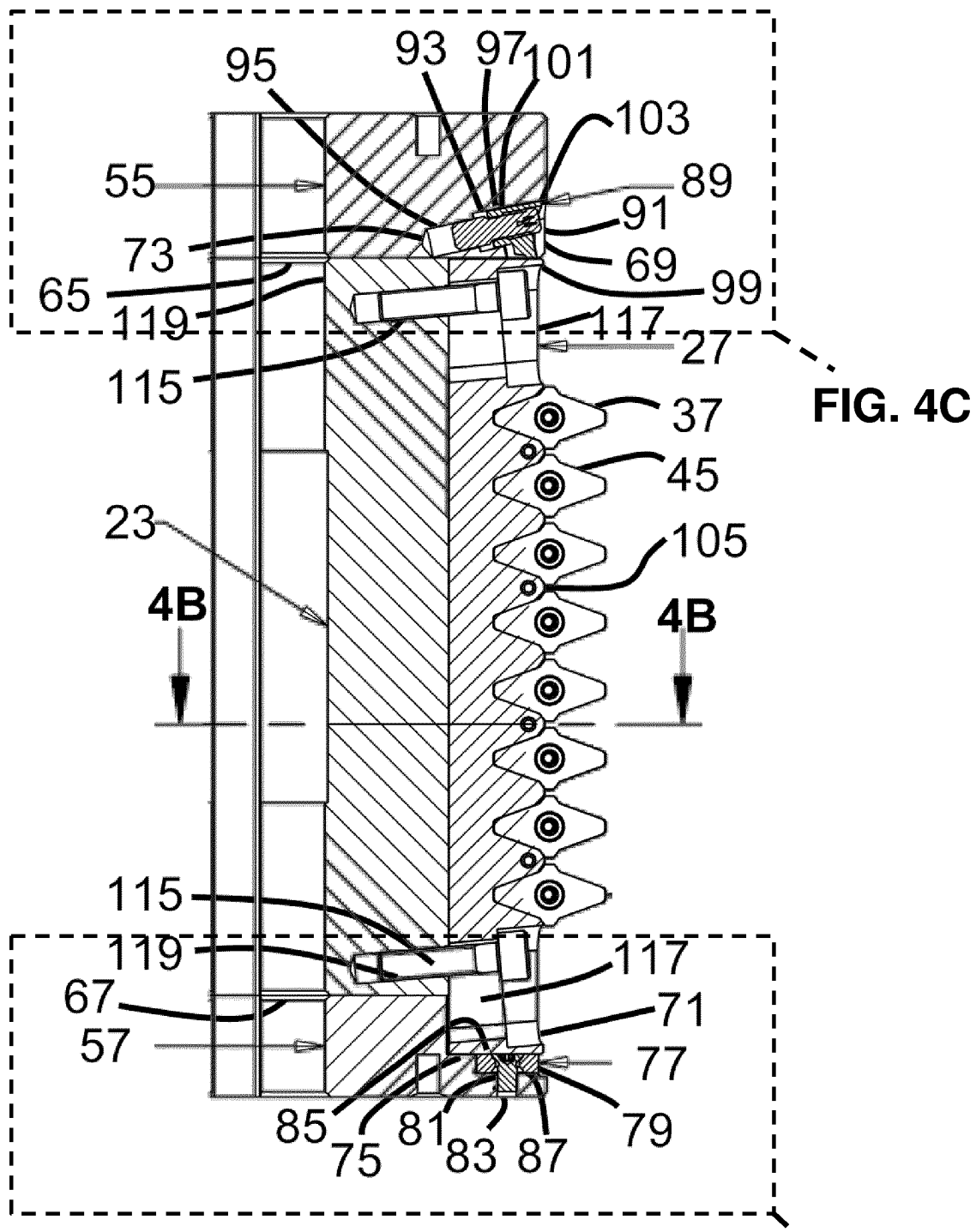
FIG. 4A is a side, cross-sectional view of the hobbing tool of FIG. 3 taken at section 4A-4A.
FIG. 4C is an enlarged cross-sectional view of a top portion of the portion of the hobbing tool shown in FIG. 4A.
FIG. 4D is an enlarged cross-sectional view of a bottom portion of the portion of the hobbing tool shown in FIG. 4A.
Figure 4C:
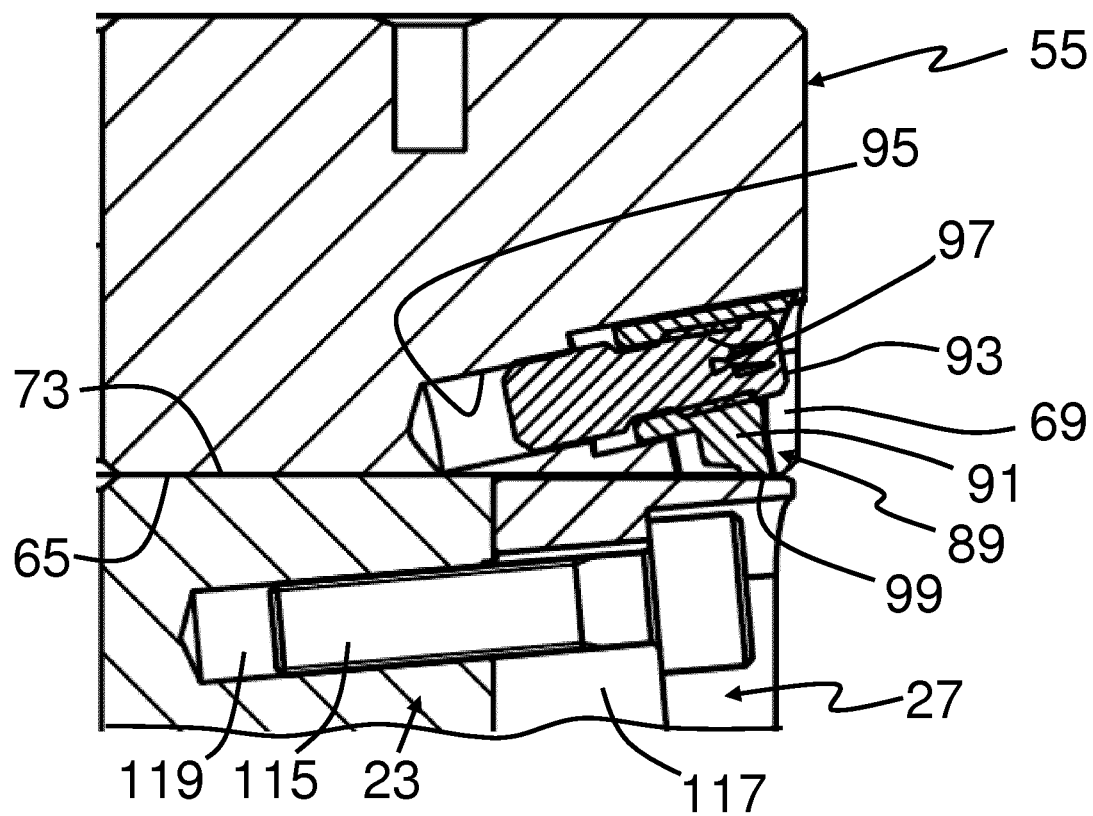
Figure 4D:
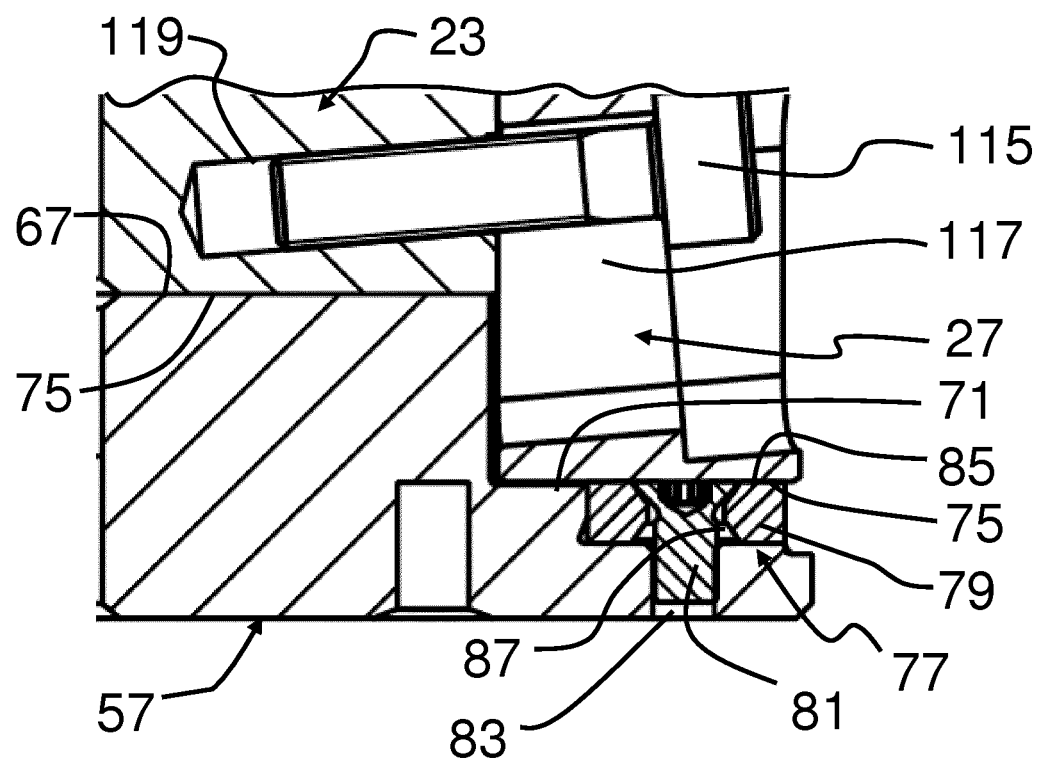

The hobbing tool 21 can comprise an anvil arrangement 77, seen in FIGS. 4A and 4C, disposed in each of the plurality of bottom recesses 71. The anvil arrangement 77 can prevent direct contact between the cassettes 27 and the axial bottoms of the bottom recesses 71 to reduce the possibility of damage to the recesses, and can also facilitate minor adjustment of the positions of the cassettes relative to one another. For example, the anvil arrangement 77 can comprise an anvil 79 and an anvil screw 81 disposed in each of the plurality of bottom recesses 71.

As seen, for example, in FIG. 4D, the anvil screw 81 can mate with internal threads in holes 83 in the bottom flange 57. The anvil 79 can comprise an abutment surface 85 for abutting a bottom end 75 of a respective one of the plurality of cassettes 27. The position of each cassette 27 can be adjusted by providing an anvil 79 of different size, by providing shims (not shown) between the anvil 79 and the bottom recesses 71, or by other means such as by providing a differential screw arrangement including internal threads in a through hole 87 in the anvil for mating with corresponding external threads on the anvil screw 81. In the differential screw arrangement, the holes 83 in the bottom flange 57 are non-perpendicular to an axis A (FIG. 2) of the hobbing tool and may be parallel to the axis. The internal threads in the holes 83 in the bottom flange 57 and the external threads on the anvil screw 81 that mate with the internal threads in the holes in the bottom flange 57 can have a different pitch or different thread hand than the internal threads in the through hole 87 of the anvil 79 that mate with the external threads on the anvil screw for mating with the internal threads in the through hole in the anvil to facilitate adjustments of the position of the abutment surface 85. Once the abutment surface 85 of the anvil 79 is in a desired position, the head of the anvil screw 81 can be sealed, such as with wax (not shown) to prevent further movement.

The hobbing tool 21 can also comprise a wedge arrangement 89, seen in FIGS. 4A and 4C, disposed in each of the plurality of top recesses 69. The wedge arrangement 89 can facilitate securely clamping the cassettes 27 in the slots 25 in the hob body 23 and between the top and bottom flanges 55 and 57. The wedge arrangement 89 can comprise a wedge 91 and a wedge screw 93 disposed in each of the plurality of top recesses 69. The wedge screw 93 can mate with internal threads in holes 95 in the top flange 55 and can extend through a hole 97 in the wedge 91. The hole 97 in the wedge may be internally threaded and mate with external threads on the wedge screw 93 that have a different pitch or different thread hand than the threads that mate with the internal threads in the holes 95 so that the wedge arrangement forms a differential screw arrangement. An abutment surface 99 of the wedge 91 abuts a top end 73 of a respective one of the plurality of cassettes 27 and a wedge surface 101 of the wedge abuts a wedge surface 103 of a respective top recess 69. The holes 95 in the top flange 55 are ordinarily perpendicular to or non-parallel with the axis A of the hobbing tool 21.

As seen in FIG. 4B, worm screws 105 can be provided in internally threaded holes 107 in the cassettes 27 to assist in securing the cassettes in the slots 25 in the hob body 23. The holes 107 in the cassettes 27 are positioned so that, when the cassettes are disposed in slots 25 in the hob body 23, one end 109 of a hole 107 is exposed and the other end 111 is adjacent a wall 113 of the slot. The worm screws 105 will typically have an end with a hex or other non-circular external or internal shape to be turned by a structure such as an Allen wrench. As the worm screws 105 are tightened so that they extend out of the end of holes 107 adjacent the walls of the slots 25, the worm screws will assist in clamping the cassettes 27 to assist in resisting tangential forces on the cassettes.

As seen, for example, in FIG. 4A, each cassette 27 of the plurality of cassettes can be removably mounted in a respective one of the plurality of axially extending slots 25 by screws 115 that extend through axially elongated slots 117 in tops and bottoms of each cassette and that mate with internal threads in holes 119 in the hob body 23. Heads of the screws 115 clamp against surfaces of the cassette adjacent the axially elongated slots 117 to clamp the cassettes 27 relative to the hob body 23. While position of the cassettes 27 relative to the hob body 23 can be adjusted by positioning the cassettes in a desired position relative to the hob body and then tightening the screws 115, the screws are particularly useful for facilitating ensuring a secure attachment of the cassettes 27 to the hob body 23, while the anvil arrangement 77 and the wedge arrangement 89 facilitate small adjustments in the position of the cassettes prior to tightening of the screws 115 (typically during assembly of the hob).

The screws 115 typically extend in a generally radial direction relative to the axis A of the hobbing tool 21 and provide a clamping force that is directed in a generally radial direction, while the worm screws 105, axes of which bisect the hobbing tool as seen in FIG. 4B, extend in a more tangential direction relative to an exterior surface of the hobbing tool and provide a clamping force in a generally tangential direction.

It is presently anticipated that a hobbing tool 21 according to the present invention will be partially pre-assembled with anvil arrangements 77 attached in the bottom flange 57 and with the top and bottom flanges 55 and 57 attached to the hob body 23. Anvil arrangements 77 may be attached in the bottom flange 57 before or after attachment of the bottom flange to the hob body 23. The anvil arrangements 77 and top and bottom flanges 55 and 57 will ordinarily not be adjusted during normal use and may be done by a manufacturer, which can facilitate erasing axial pitch deviations between cassettes due to improper positioning of cassettes by an end user.

Cutting inserts 37 are attached to cassettes 27 in seating recesses 29 of the cassettes with the screws 45.

Usually after attaching the cutting inserts 37 to the cassettes 27, the cassettes are then positioned in slots 25 in the hobbing tool 21 so that bottom ends 75 of the cassettes abut against the abutment surfaces 85 of the anvils 79 of the anvil arrangements 77. While the cutting inserts 37 might be attached to the cassettes 27 after the cassettes are in the slots 25 in some embodiments of the present invention, it will be seen that, in the illustrated embodiment, the screws 45 may be wholly or partially obscured by the hob body 23 when the cassettes are in the slots. The cassettes 27 are then loosely secured in the slots 25 by the screws 115 that extend through the axially elongated slots 117 into the internally threaded holes 119 in the hob body 23.

The cassettes 27 are then clamped in an axial direction between the anvil arrangement 77 and the wedge arrangement 89 by wedging the wedges 91 between the top ends 73 of the cassettes and the bottom ends of the top recesses 69 of the top flange 55.

The cassettes 27 are then clamped in a generally tangential direction by tightening the worm screws 105 so that they extend out of the ends 111 of the holes 107 in the cassettes and abut against the walls 113 of the slots 25.

Finally, the cassettes 27 are fully secured in the slots 25 by fully tightening the screws 115 that extend through the axially elongated slots 117 into the internally threaded holes 119 in the hob body 23.

Cutting inserts 37 can be indexed according to a schedule or upon observation of damage to a particular insert. The steps for removing the cassette 27 to permit indexing of cutting inserts 37 will ordinarily be the same as the steps for attaching the cassette, performed in reverse order.

The cutting inserts 37 can be made of any suitable material, such as a coated cemented carbide material. Similarly, the hob body 23, the cassettes 27, and the top and bottom flanges 55 and 57 are made of suitable materials, such as tool steel or quenched and tempered steel.

The term 'small' module hob may here mean a hob with a working diameter that is 5 to 8 times a longest length of the cutting insert 37.

One or more calibration pins (not shown) can be provided to extend through one or more calibration holes 121 (FIG. 2) in the hob body 23 to be received in corresponding calibration holes 123 (FIG. 2) extending part of the way through the bottom flange 57 and calibration holes (not shown) extending part of the way through the top flange 55. In this way, correct orientation of the top flange 55, the bottom flange 57, and the hob body 23 can be facilitated during assembly and in the event of disassembly and reassembly and the calibration pins need not be exposed except after disassembly.

Figure 3:
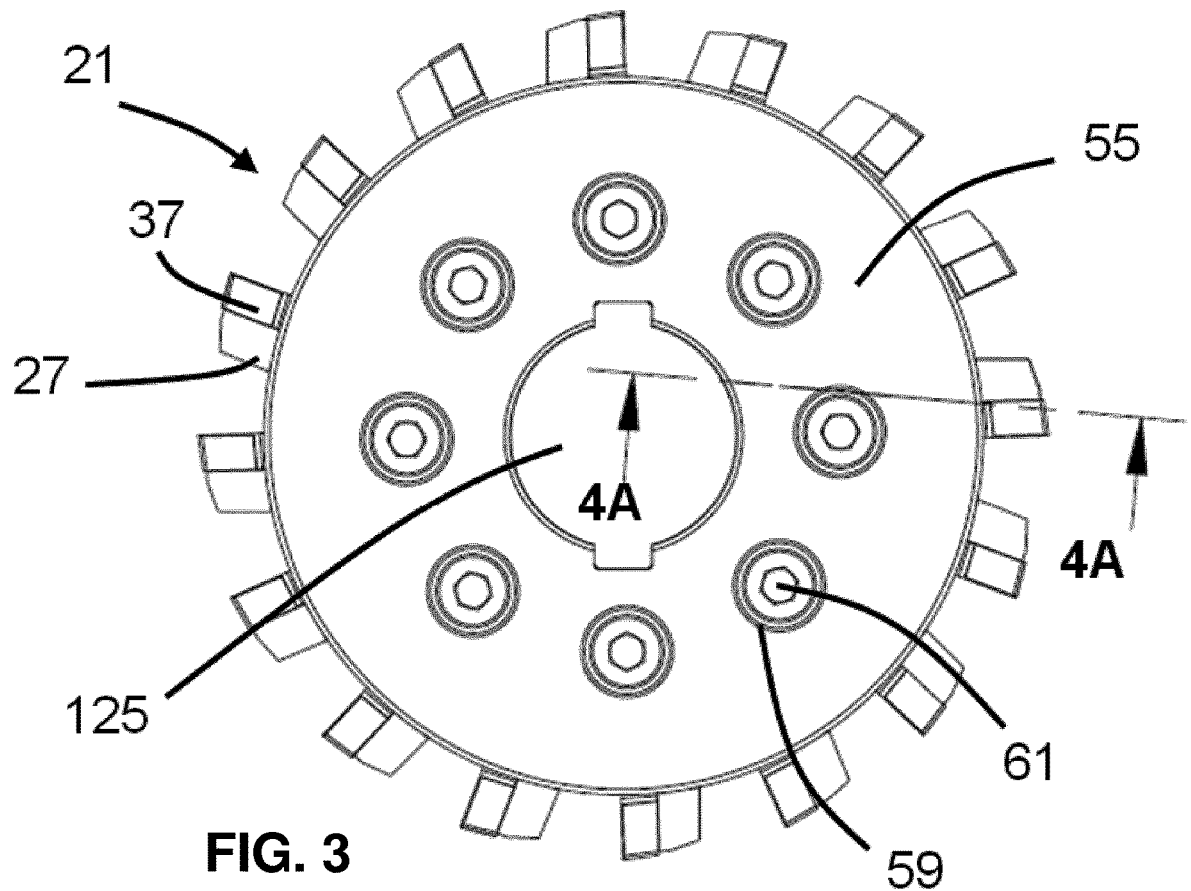
FIG. 3 is a top view of the hobbing tool according to an aspect of the present invention.

Torque transmission from a drive shaft (not shown) will typically be via a non-circular central opening 125 in the hob body 23 as seen, for example, in FIG. 3. The drive shaft need not contact the top and bottom flanges 55 and 57.

The single block design of the cassettes 27 facilitates providing a precise pitch between adjacent cutting inserts 37 because each cassette is identical to every other cassette. Repeatability of proper locating of cutting inserts relative to their insert pockets is facilitated by provision of the bottom and angled supporting surfaces 39, 41, and 43 of the cutting inserts, and the bottom and angled abutment surfaces 31, 33, and 35 of the seating recesses 29.

Figure 6A:
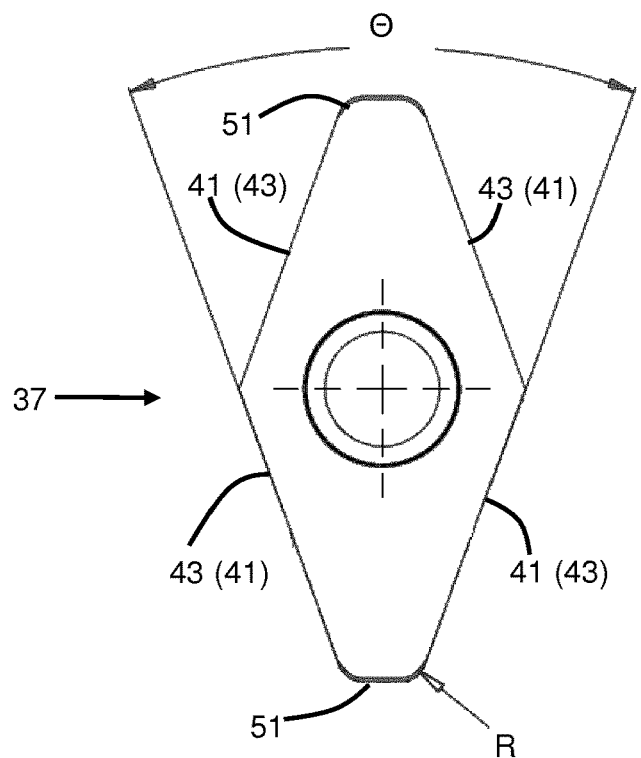
FIGS. 6A and 6B are top views of cutting inserts according to aspects of the present invention.
Figure 6B:
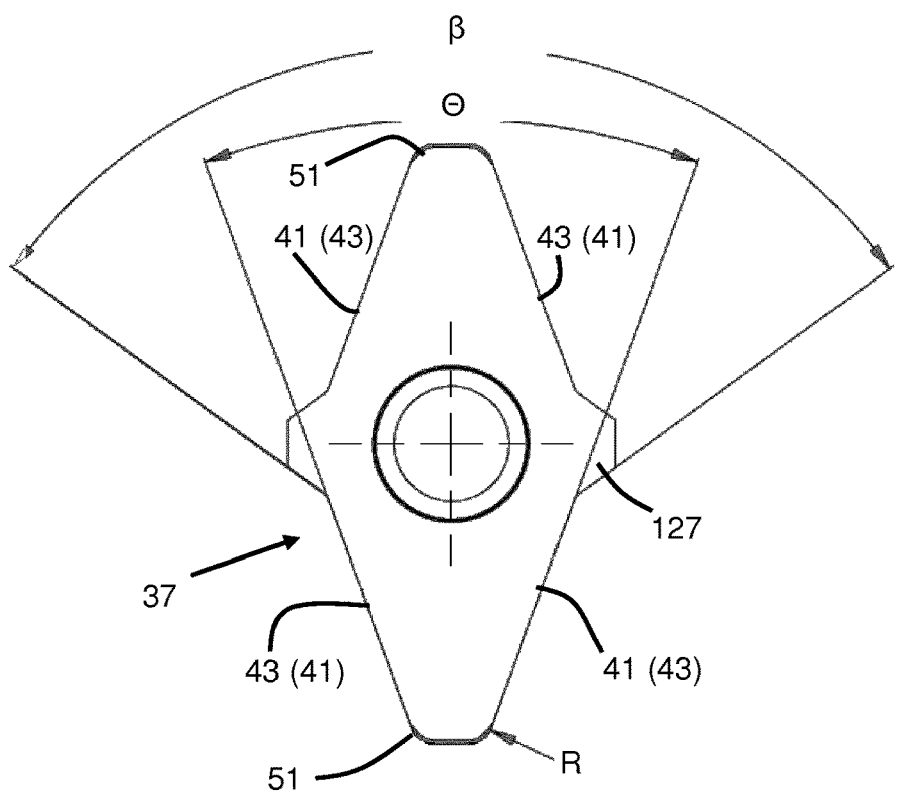

It will be appreciated that, by fixing different cutting inserts, such as the insert of FIG. 6A or the insert of FIG. 6B, on the same cassette 27 it is possible to obtain differences in gear profiles by, for example, providing different tool tip radii R, providing protuberances on the insert, providing a semi-topping 127 (FIG. 6B) for gear tooth chamfering to provide a chamfer of angle $\beta$, or by differences in addendum and/or dedendum.

By changing both cutting inserts and cassettes on a hobbing tool, it is possible to obtain considerable differences in gear profiles, such as by modifying pressure angle, addendum and/or dedendum, or other profile requirements. Different tooth heights can also be provided by appropriate selection of inserts and cassettes.

For instance, the cassettes 27 may be interchangeable in all slots by being identical. In case of a seating recess damage it will be possible to easily provide a cassette spare part. The top flange 55 and the bottom flange 57 may include main hob thread pitch to allow for managing even different modules by using the same hob body 23, paired with different flanges and cassettes. Together with the flange 55 and/or 57, the presently claimed hobbing tool may use pre-calibrated anvils 79 for a fine factory adjustment. By using optional, simply adjustable, wedge arrangements 89 located opposed to pre-calibrated anvils 79, setting of cassettes along the hob thread can be facilitated for a better gear quality results.

In the present application, the use of terms such as "including" is open-ended and is intended to have the same meaning as terms such as "comprising" and not preclude the presence of other structure, material, or acts. Similarly, though the use of terms such as "can" or "may" is intended to be open-ended and to reflect that structure, material, or acts are not necessary, the failure to use such terms is not intended to reflect that structure, material, or acts are essential. To the extent that structure, material, or acts are presently considered to be essential, they are identified as such.

While this invention has been illustrated and described in accordance with a preferred embodiment, it is recognized that variations and changes may be made therein without departing from the invention as set forth in the claims.

The disclosures in EP Patent Application No. 16177229.8, from which this application claims priority, are incorporated herein by reference.

What is claimed is:
1. A hobbing tool comprising:
a hob body including a plurality of axially extending slots;
a top flange and a bottom flange attached to the hob body;
at least one cassette removably disposed in at least one of the plurality of axially extending slots, the at least one cassette including at least one seating recess having at least a bottom abutment surface and two side abutment surfaces;

at least one cutting insert removably mounted in the at least one seating recess, the at least one cutting insert having at least one bottom supporting surface and two side supporting surfaces that abut the bottom abutment surface and the two side abutment surfaces when the at least one cutting insert is received in the at least one seating recess; and a plurality of cassettes removably mounted in the plurality of axially extending slots each of the plurality of cassettes being identical, wherein the hob body includes a corresponding number of of slots as cassettes, wherein the top flange has a bottom end facing the hob body and the bottom flange has a top end facing the hob body, and the bottom end of the top flange and the top end of the bottom flange each having a corresponding plurality of top recesses and bottom recesses for receiving top ends and bottom ends, respectively, of respective ones of the plurality of cassettes, each recess of at least one of the plurality of top recesses in the top flange and the plurality of bottom recesses in the bottom flange having a different axial depth than any other recess of the at least one of the plurality of top recesses in the top flange and the plurality of bottom recesses in the bottom flange.

2. The hobbing tool as set forth in claim 1, wherein each recess of the plurality of recesses in the bottom flange has a different axial depth than any other recess of the plurality of recesses in the bottom flange.

3. The hobbing tool as set forth in claim 1, wherein each recess of the plurality of recesses in the top flange has a different axial depth than any other recess of the plurality of recesses in the top flange.

4. The hobbing tool as set forth in claim 1, further comprising an anvil arrangement including an anvil and an anvil screw disposed in each of the plurality of bottom recesses, the anvil screw mating with internal threads in holes in the bottom flange, and an abutment surface of each anvil abutting a bottom end of a respective one of the plurality of cassettes.

5. The hobbing tool as set forth in claim 1, further comprising a wedge arrangement including a wedge and a wedge screw disposed in each of the plurality of top recesses, the wedge screw mating with internal threads in holes in the top flange and with internal threads in holes in the wedge, and an abutment surface of the wedge abutting a top end of a respective one of the plurality of cassettes and a wedge surface of the wedge abutting a wedge surface of a respective top recess.

6. The hobbing tool as set forth in claim 1, wherein each cassette of the plurality of cassettes is removably mounted in a respective one of the plurality of axially extending slots by screws that extend through axially elongated slots in tops and bottoms of each cassette and that mate with internal threads in holes in the hob body.

7. The hobbing tool as set forth in claim 1, wherein the plurality of cassettes are mounted relative to the hob body so that cutting inserts on the plurality of cassettes form a helix.

8. The hobbing tool as set forth in claim 1, wherein each cassette of the plurality of cassettes has a plurality of seating recesses and wherein a corresponding plurality of cutting inserts is removably mounted in each of the plurality of seating recesses.

9. The hobbing tool as set forth in claim 1, wherein the at least one cutting insert has four sides of equal length.

10. The hobbing tool as set forth in claim 1, wherein the at least one cutting insert is indexable to four positions.

* * * * *